(12) United States Patent
Zhang et al.

(10) Patent No.: US 12,555,553 B2
(45) Date of Patent: Feb. 17, 2026

(54) DYNAMIC CONFIGURATION OF DISPLAY OPTIMIZATION

(71) Applicant: QUALCOMM Incorporated, San Diego, CA (US)

(72) Inventors: Nan Zhang, Beijing (CN); Mark Sternberg, Toronto (CA); Yongjun Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/845,402

(22) PCT Filed: Apr. 18, 2022

(86) PCT No.: PCT/CN2022/087329
§ 371 (c)(1),
(2) Date: Sep. 9, 2024

(87) PCT Pub. No.: WO2023/201456
PCT Pub. Date: Oct. 26, 2023

(65) Prior Publication Data
US 2025/0210009 A1    Jun. 26, 2025

(51) Int. Cl.
*G09G 5/12* (2006.01)
*G09G 3/20* (2006.01)
*G09G 5/00* (2006.01)

(52) U.S. Cl.
CPC ............. *G09G 5/12* (2013.01); *G09G 3/2003* (2013.01); *G09G 5/008* (2013.01);
(Continued)

(58) Field of Classification Search
CPC ........ G09G 5/12; G09G 5/008; G09G 3/2003; G09G 2320/064; G09G 2320/0666;
(Continued)

(56) References Cited

U.S. PATENT DOCUMENTS 9,057,931 B1 * 6/2015 Baldwin ................ G03B 17/48
9,407,797 B1   8/2016 Newell et al.
(Continued)

FOREIGN PATENT DOCUMENTS

JP    2003072144 A    3/2003
WO    2021106513 A1   6/2021

OTHER PUBLICATIONS

International Search Report and Written Opinion—PCT/CN2022/087329—ISA/CN—Dec. 19, 2022.
(Continued)

*Primary Examiner* — Brent D Castiaux
(74) *Attorney, Agent, or Firm* — Procopio, Cory, Hargreaves & Savitch LLP

(57) ABSTRACT

Aspects presented herein relate to methods and devices for display processing including an apparatus, e.g., a DPU. The apparatus may obtain an ALS value for at least one of a camera run time or a display run time. The apparatus may also calculate at least one of a camera duty cycle for a camera, a display duty cycle for a display, or a switching frequency based on the ALS value. Further, the apparatus may adjust at least one of the camera duty cycle, the display duty cycle, or the switching frequency based on at least one of the camera run time, the display run time, the ALS value, a camera margin time, or a display margin time.

29 Claims, 11 Drawing Sheets

(52) U.S. Cl.
CPC ............... *G09G 2320/064* (2013.01); *G09G 2320/0666* (2013.01); *G09G 2320/0673* (2013.01); *G09G 2320/0693* (2013.01); *G09G 2354/00* (2013.01); *G09G 2360/144* (2013.01)

(58) Field of Classification Search
CPC ... G09G 2320/0673; G09G 2320/0693; G09G 2354/00; G09G 2360/144; G09G 3/2014; G09G 2320/0626; G09G 2320/0276; G09G 2340/0435; G06F 1/1626; G06F 1/1686; H04N 23/60; H04N 23/73; H04N 7/144

See application file for complete search history.

(56) References Cited

U.S. PATENT DOCUMENTS

| | | | |
|---|---|---|---|
| 2018/0182306 A1 | 6/2018 | Seong et al. | |
| 2020/0348170 A1* | 11/2020 | Maucotel | G09G 3/3406 |
| 2020/0355550 A1 | 11/2020 | Theiler et al. | |
| 2021/0233493 A1* | 7/2021 | Raynor | G09G 5/10 |
| 2021/0233494 A1* | 7/2021 | Takazane | G09G 3/3225 |
| 2022/0091675 A1 | 3/2022 | Zazzera et al. | |
| 2022/0116519 A1 | 4/2022 | Nikhara et al. | |

OTHER PUBLICATIONS

Supplementary European Search Report EP22937697 Search Authority Munich Sep. 18, 2025.

* cited by examiner

DYNAMIC CONFIGURATION OF DISPLAY OPTIMIZATION

CROSS REFERENCE TO RELATED APPLICATION(S)

This application is a National Stage Application filed under 35 U.S.C. § 371 of PCT International Application No. PCT/CN2022/087329, entitled "DYNAMIC CONFIGURATION OF DISPLAY OPTIMIZATION" and filed Apr. 18, 2022, which is expressly incorporated by reference herein in its entirety.

TECHNICAL FIELD

The present disclosure relates generally to processing systems and, more particularly, to one or more techniques for display processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor is configured to convert digital information received from a CPU to analog values and may issue commands to a display panel for displaying the visual content. A device that provides content for visual presentation on a display may utilize a GPU and/or a display processor.

A GPU of a device may be configured to perform the processes in a graphics processing pipeline. Further, a display processor or display processing unit (DPU) may be configured to perform the processes of display processing. However, with the advent of wireless communication and smaller, handheld devices, there has developed an increased need for improved graphics or display processing.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a display processing unit (DPU) or any apparatus that may perform display processing. The apparatus may obtain an ambient light sensor (ALS) value for at least one of a camera run time or a display run time. The apparatus may also calculate at least one of a camera duty cycle for a camera, a display duty cycle for a display, or a switching frequency based on the ALS value. Additionally, the apparatus may calculate at least one of the camera margin time for the camera, a camera phase for the camera, the display margin time for the display, or a display phase for the display, where at least one of the camera duty cycle, the display duty cycle, or the switching frequency is adjusted based on at least the calculated camera margin time, the calculated camera phase, the calculated display margin time, or the calculated display phase. The apparatus may also activate a camera sensor for the camera run time or a display module for the display run time based on at least one of the camera duty cycle, the display duty cycle, the switching frequency, the camera margin time, or the display margin time, where at least one of the camera duty cycle, the display duty cycle, or the switching frequency is adjusted based on the activated camera sensor or the activated display module. Moreover, the apparatus may adjust at least one of the camera duty cycle, the display duty cycle, or the switching frequency based on at least one of the camera run time, the display run time, the ALS value, a camera margin time, or a display margin time. The apparatus may also modify at least one of a color value of the display or a brightness value of the display based on at least one of an activation of the display, a deactivation of the display, an activation of the camera, or a deactivation of the camera. The apparatus may also store, in a memory or a buffer, data associated with at least one of the adjusted camera duty cycle, the adjusted display duty cycle, or the adjusted switching frequency.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
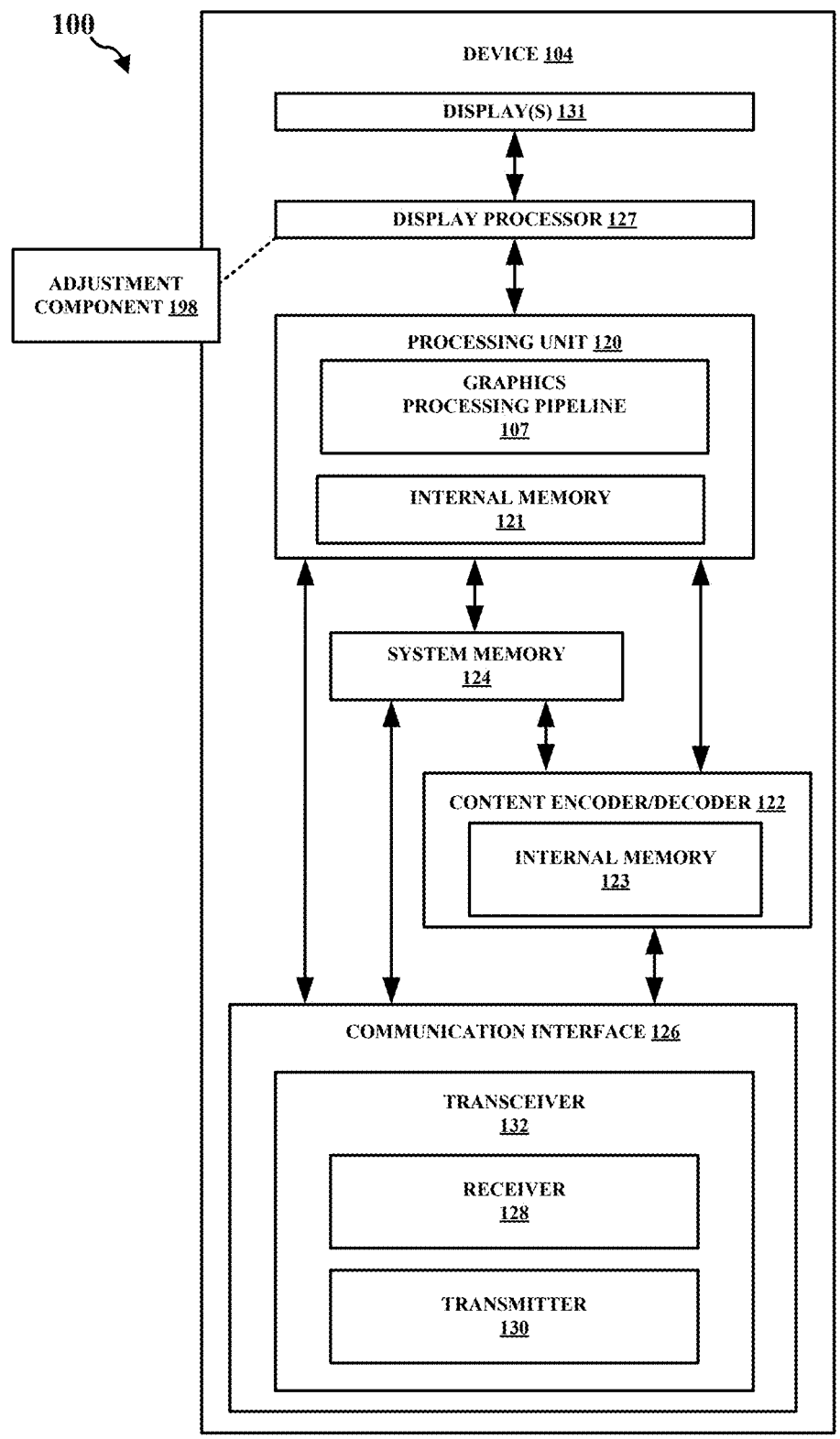
FIG. 1 is a block diagram that illustrates an example content generation system.

Some aspects of display processing may utilize a number of different locations for a display camera. For instance, an under-display camera (i.e., a camera that is located beneath at least one display layer in a device) is one example of a camera location design in modern smart phones and mobile handset devices. The location of the display camera may be selected based on a number of different categories, such as convenience and visual quality improvement. Additionally, in order to optimize camera visual quality, a camera exposure time and a display lighting time may be time division multiplexed (TDM'd). By time division multiplexing the camera exposure time and the display lighting time, this may help to optimize a camera visual quality by reducing the amount of display lightning interferences. This may be accomplished by utilizing a fixed time division duplexing (TDD) duty cycle for both the camera exposure time (i.e., the camera duty cycle) and the display lighting time (i.e., the display duty cycle). For example, the camera duty cycle may be a fixed camera TDD duty cycle and the display duty cycle may be a fixed display TDD duty cycle. As indicated above, the camera duty cycle and the display duty cycle may be finely tuned as TDD duty cycles. For instance, the camera duty cycle and the display duty cycle may be finely tuned and fixed in a predetermined location, e.g., a lab. Further, the camera duty cycle and the display duty cycle may be fixed as constant time periods (i.e., constant duty cycles). This type of constant duty cycle may be relatively easy to implement, but it may not be an ideal solution as both the display lighting time and the camera exposure time may need to be increased or decreased in order to produce an improved visual quality. Indeed, the constant duty cycle may not allow for dynamic configurations of the display lighting time and/or the camera exposure time. For example, the camera may need an increased exposure time while the display may need an increased lightning time in order to increase display brightness. Moreover, the display may need a decreased lightning time in order to reduce display burning and aging. As indicated above, one challenge of working with certain types of display cameras (e.g., under-display cameras) is that the visual quality of the camera and the display may not be ideal when utilizing time division multiplexing. For instance, in order for the display to work properly when the display is turned on, the camera may need to be turned off. Likewise, in order for the camera to work properly and when the camera is activated, the display may need to be turned off. Further, due to switching between the activation of the display and the activation of the camera, the camera may not receive enough exposure time and the display may not receive enough display lighting time. Aspects of the present disclosure may utilize a camera duty cycle and a display duty cycle that are dynamic or adjustable. For instance, aspects of the present disclosure may utilize a camera duty cycle that is an adjustable time division duplexing (TDD) camera duty cycle and a display duty cycle that is an adjustable TDD display duty cycle. Additionally, in some instances, aspects of the present disclosure may utilize an adjustable switching frequency for the camera and/or display. For example, aspects of the present disclosure may utilize an adjustable switching frequency based on an ambient light sensor (ALS) value for a camera run time and a display run time. That is, aspects presented herein may utilize an adaptive TDD regional duty cycle for ambient light and/or an exposure time. Moreover, aspects presented herein may utilize an adaptive display run time calibration.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software may be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that may be accessed by a computer. By way of example, and not limitation, such computer-readable media may comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that may be used to store computer executable code in the form of instructions or data structures that may be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 may include a number of components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this may be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 may include a communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the display processor 127 may include an adjustment component 198 configured to obtain an ambient light sensor (ALS) value for at least one of a camera run time or a display run time. The adjustment component 198 may also be configured to calculate at least one of a camera duty cycle for a camera, a display duty cycle for a display, or a switching frequency based on the ALS value. The adjustment component 198 may also be configured to calculate at least one of the camera margin time for the camera, a camera phase for the camera, the display margin time for the display, or a display phase for the display, where at least one of the camera duty cycle, the display duty cycle, or the switching frequency is adjusted based on at least the calculated camera margin time, the calculated camera phase, the calculated display margin time, or the calculated display phase. The adjustment component 198 may also be configured to activate a camera sensor for the camera run time or a display module for the display run time based on at least one of the camera duty cycle, the display duty cycle, the switching frequency, the camera margin time, or the display margin time, where at least one of the camera duty cycle, the display duty cycle, or the switching frequency is adjusted based on the activated camera sensor or the activated display module. The adjustment component 198 may also be configured to adjust at least one of the camera duty cycle, the display duty cycle, or the switching frequency based on at least one of the camera run time, the display run time, the ALS value, a camera margin time, or a display margin time. The adjustment component 198 may also be configured to modify at least one of a color value of the display or a brightness value of the display based on at least one of an activation of the display, a deactivation of the display, an activation of the camera, or a deactivation of the camera. The adjustment component 198 may also be configured to store, in a memory or a buffer, data associated with at least one of the adjusted camera duty cycle, the adjusted display duty cycle, or the adjusted switching frequency. Although the following description may be focused on display processing, the concepts described herein may be applicable to other similar processing techniques.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, may be performed using other components (e.g., a CPU), consistent with disclosed embodiments.

GPUs may process multiple types of data or data packets in a GPU pipeline. For instance, in some aspects, a GPU may process two types of data or data packets, e.g., context register packets and draw call data. A context register packet may be a set of global state information, e.g., information regarding a global register, shading program, or constant data, which may regulate how a graphics context will be processed. For example, context register packets may include information regarding a color format. In some aspects of context register packets, there may be a bit that indicates which workload belongs to a context register. Also, there may be multiple functions or programming running at the same time and/or in parallel. For example, functions or programming may describe a certain operation, e.g., the color mode or color format. Accordingly, a context register may define multiple states of a GPU.

Context states may be utilized to determine how an individual processing unit functions, e.g., a vertex fetcher (VFD), a vertex shader (VS), a shader processor, or a geometry processor, and/or in what mode the processing unit functions. In order to do so, GPUs may use context registers and programming data. In some aspects, a GPU may generate a workload, e.g., a vertex or pixel workload, in the pipeline based on the context register definition of a mode or state. Certain processing units, e.g., a VFD, may use these states to determine certain functions, e.g., how a vertex is assembled. As these modes or states may change, GPUs may need to change the corresponding context. Additionally, the workload that corresponds to the mode or state may follow the changing mode or state.

Figure 2:
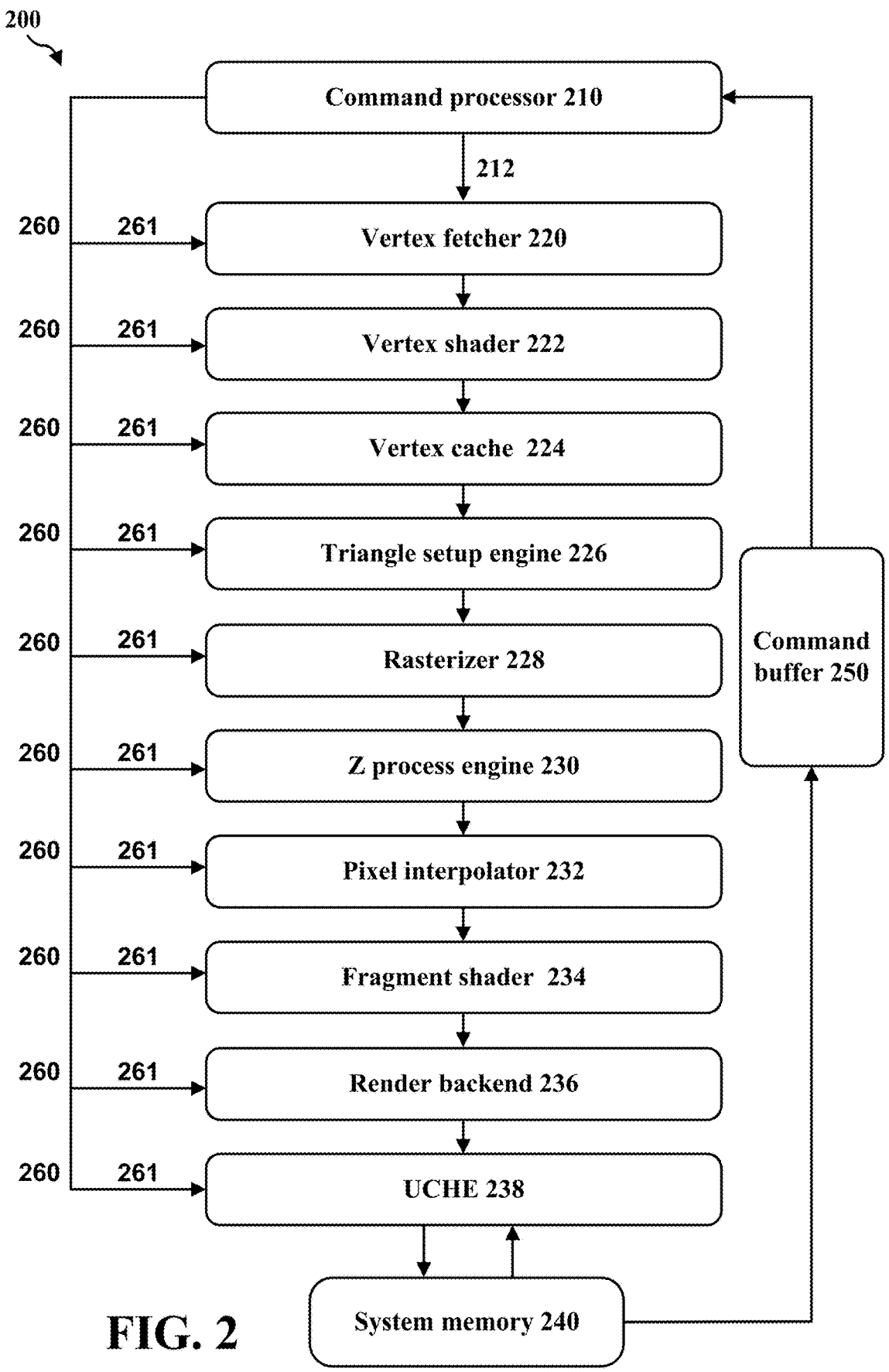
FIG. 2 illustrates an example graphics processing unit (GPU).

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, level 2 (L2) cache (UCHE) 238, and system memory 240. Although FIG. 2 displays that GPU 200 includes processing units 220-238, GPU 200 may include a number of additional processing units. Additionally, processing units 220-238 are merely an example and any combination or order of processing units may be used by GPUS according to the present disclosure. GPU 200 also includes command buffer 250, context register packets 260, and context states 261.

As shown in FIG. 2, a GPU may utilize a CP, e.g., CP 210, or hardware accelerator to parse a command buffer into context register packets, e.g., context register packets 260, and/or draw call data packets, e.g., draw call packets 212. The CP 210 may then send the context register packets 260 or draw call packets 212 through separate paths to the processing units or blocks in the GPU. Further, the command buffer 250 may alternate different states of context registers and draw calls. For example, a command buffer may be structured in the following manner: context register of context N, draw call(s) of context N, context register of context N+1, and draw call(s) of context N+1.

GPUs may render images in a variety of different ways. In some instances, GPUs may render an image using rendering and/or tiled rendering. In tiled rendering GPUs, an image may be divided or separated into different sections or tiles. After the division of the image, each section or tile may be rendered separately. Tiled rendering GPUs may divide computer graphics images into a grid format, such that each portion of the grid, i.e., a tile, is separately rendered. In some aspects, during a binning pass, an image may be divided into different bins or tiles. In some aspects, during the binning pass, a visibility stream may be constructed where visible primitives or draw calls may be identified. In contrast to tiled rendering, direct rendering does not divide the frame into smaller bins or tiles. Rather, in direct rendering, the entire frame is rendered at a single time. Additionally, some types of GPUs may allow for both tiled rendering and direct rendering.

Figure 3:
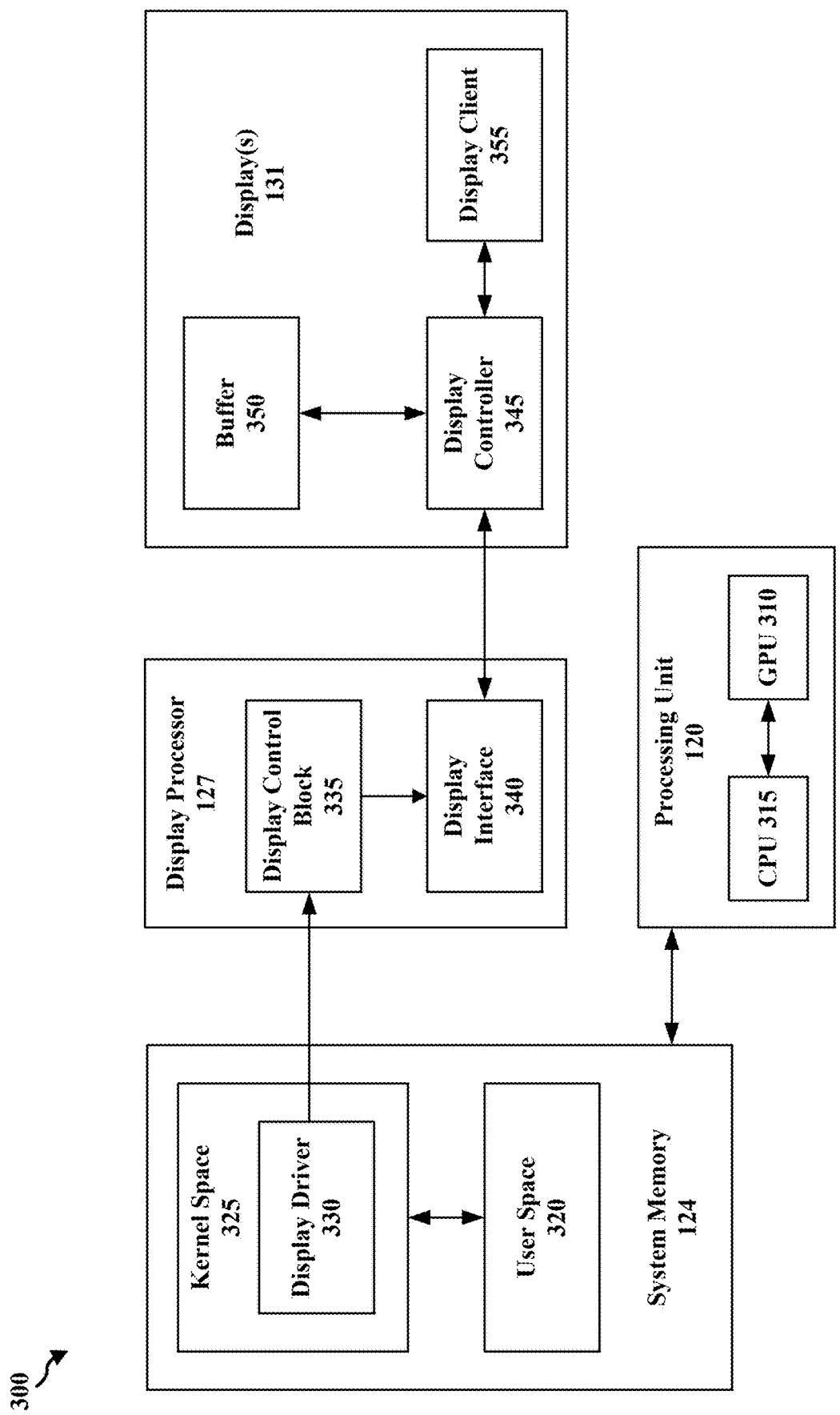
FIG. 3 illustrates an example display framework including a display processor and a display.

FIG. 3 is a block diagram 300 that illustrates an example display framework including the processing unit 120, the system memory 124, the display processor 127, and the display(s) 131, as may be identified in connection with the device 104.

A GPU may be included in devices that provide content for visual presentation on a display. For example, the processing unit 120 may include a GPU 310 configured to render graphical data for display on a computing device (e.g., the device 104), which may be a computer workstation, a mobile phone, a smartphone or other smart device, an embedded system, a personal computer, a tablet computer, a video game console, and the like. Operations of the GPU 310 may be controlled based on one or more graphics processing commands provided by a CPU 315. The CPU 315 may be configured to execute multiple applications concurrently. In some cases, each of the concurrently executed multiple applications may utilize the GPU 310 simultaneously. Processing techniques may be performed via the processing unit 120 output a frame over physical or wireless communication channels.

The system memory 124, which may be executed by the processing unit 120, may include a user space 320 and a kernel space 325. The user space 320 (sometimes referred to as an "application space") may include software application(s) and/or application framework(s). For example, software application(s) may include operating systems, media applications, graphical applications, workspace applications, etc. Application framework(s) may include frameworks used by one or more software applications, such as libraries, services (e.g., display services, input services, etc.), application program interfaces (APIs), etc. The kernel space 325 may further include a display driver 330. The display driver 330 may be configured to control the display processor 127. For example, the display driver 330 may cause the display processor 127 to compose a frame and transmit the data for the frame to a display.

The display processor 127 includes a display control block 335 and a display interface 340. The display processor 127 may be configured to manipulate functions of the display(s) 131 (e.g., based on an input received from the display driver 330). The display control block 335 may be further configured to output image frames to the display(s) 131 via the display interface 340. In some examples, the display control block 335 may additionally or alternatively perform post-processing of image data provided based on execution of the system memory 124 by the processing unit 120.

The display interface 340 may be configured to cause the display(s) 131 to display image frames. The display interface 340 may output image data to the display(s) 131 according to an interface protocol, such as, for example, the MIPI DSI (Mobile Industry Processor Interface, Display Serial Interface). That is, the display(s) 131, may be configured in accordance with MIPI DSI standards. The MIPI DSI standard supports a video mode and a command mode. In examples where the display(s) 131 is/are operating in video mode, the display processor 127 may continuously refresh the graphical content of the display(s) 131. For example, the entire graphical content may be refreshed per refresh cycle (e.g., line-by-line). In examples where the display(s) 131 is/are operating in command mode, the display processor 127 may write the graphical content of a frame to a buffer 350.

In some such examples, the display processor 127 may not continuously refresh the graphical content of the display(s) 131. Instead, the display processor 127 may use a vertical synchronization (Vsync) pulse to coordinate rendering and consuming of graphical content at the buffer 350. For example, when a Vsync pulse is generated, the display processor 127 may output new graphical content to the buffer 350. Thus, generation of the Vsync pulse may indicate that current graphical content has been rendered at the buffer 350.

Frames are displayed at the display(s) 131 based on a display controller 345, a display client 355, and the buffer 350. The display controller 345 may receive image data from the display interface 340 and store the received image data in the buffer 350. In some examples, the display controller 345 may output the image data stored in the buffer 350 to the display client 355. Thus, the buffer 350 may represent a local memory to the display(s) 131. In some examples, the display controller 345 may output the image data received from the display interface 340 directly to the display client 355.

The display client 355 may be associated with a touch panel that senses interactions between a user and the display(s) 131. As the user interacts with the display(s) 131, one or more sensors in the touch panel may output signals to the display controller 345 that indicate which of the one or more sensors have sensor activity, a duration of the sensor activity, an applied pressure to the one or more sensor, etc. The display controller 345 may use the sensor outputs to determine a manner in which the user has interacted with the display(s) 131. The display(s) 131 may be further associated with/include other devices, such as a camera, a microphone, and/or a speaker, that operate in connection with the display client 355.

Some processing techniques of the device 104 may be performed over three stages (e.g., stage 1: a rendering stage; stage 2: a composition stage; and stage 3: a display/transfer stage). However, other processing techniques may combine the composition stage and the display/transfer stage into a single stage, such that the processing technique may be executed based on two total stages (e.g., stage 1: the rendering stage; and stage 2: the composition/display/transfer stage). During the rendering stage, the GPU 310 may process a content buffer based on execution of an application that generates content on a pixel-by-pixel basis. During the composition and display stage(s), pixel elements may be assembled to form a frame that is transferred to a physical display panel/subsystem (e.g., the displays 131) that displays the frame.

Instructions executed by a CPU (e.g., software instructions) or a display processor may cause the CPU or the display processor to search for and/or generate a composition strategy for composing a frame based on a dynamic priority and runtime statistics associated with one or more composition strategy groups. A frame to be displayed by a physical display device, such as a display panel, may include a plurality of layers. Also, composition of the frame may be based on combining the plurality of layers into the frame (e.g., based on a frame buffer). After the plurality of layers are combined into the frame, the frame may be provided to the display panel for display thereon. The process of combining each of the plurality of layers into the frame may be referred to as composition, frame composition, a composition procedure, a composition process, or the like.

A frame composition procedure or composition strategy may correspond to a technique for composing different layers of the plurality of layers into a single frame. The plurality of layers may be stored in doubled data rate (DDR) memory. Each layer of the plurality of layers may further correspond to a separate buffer. A composer or hardware composer (HWC) associated with a block or function may determine an input of each layer/buffer and perform the frame composition procedure to generate an output indicative of a composed frame. That is, the input may be the layers and the output may be a frame composition procedure for composing the frame to be displayed on the display panel.

Some aspects of display processing may utilize different types of mask layers, e.g., a shape mask layer. A mask layer is a layer that may represent a portion of a display or display panel. For instance, an area of a mask layer may correspond to an area of a display, but the entire mask layer may depict a portion of the content that is actually displayed at the display or panel. For example, a mask layer may include a top portion and a bottom portion of a display area, but the middle portion of the mask layer may be empty. In some examples, there may be multiple mask layers to represent different portions of a display area. Also, for certain portions of a display area, the content of different mask layers may overlap with one another. Accordingly, a mask layer may represent a portion of a display area that may or may not overlap with other mask layers.

Figure 4:
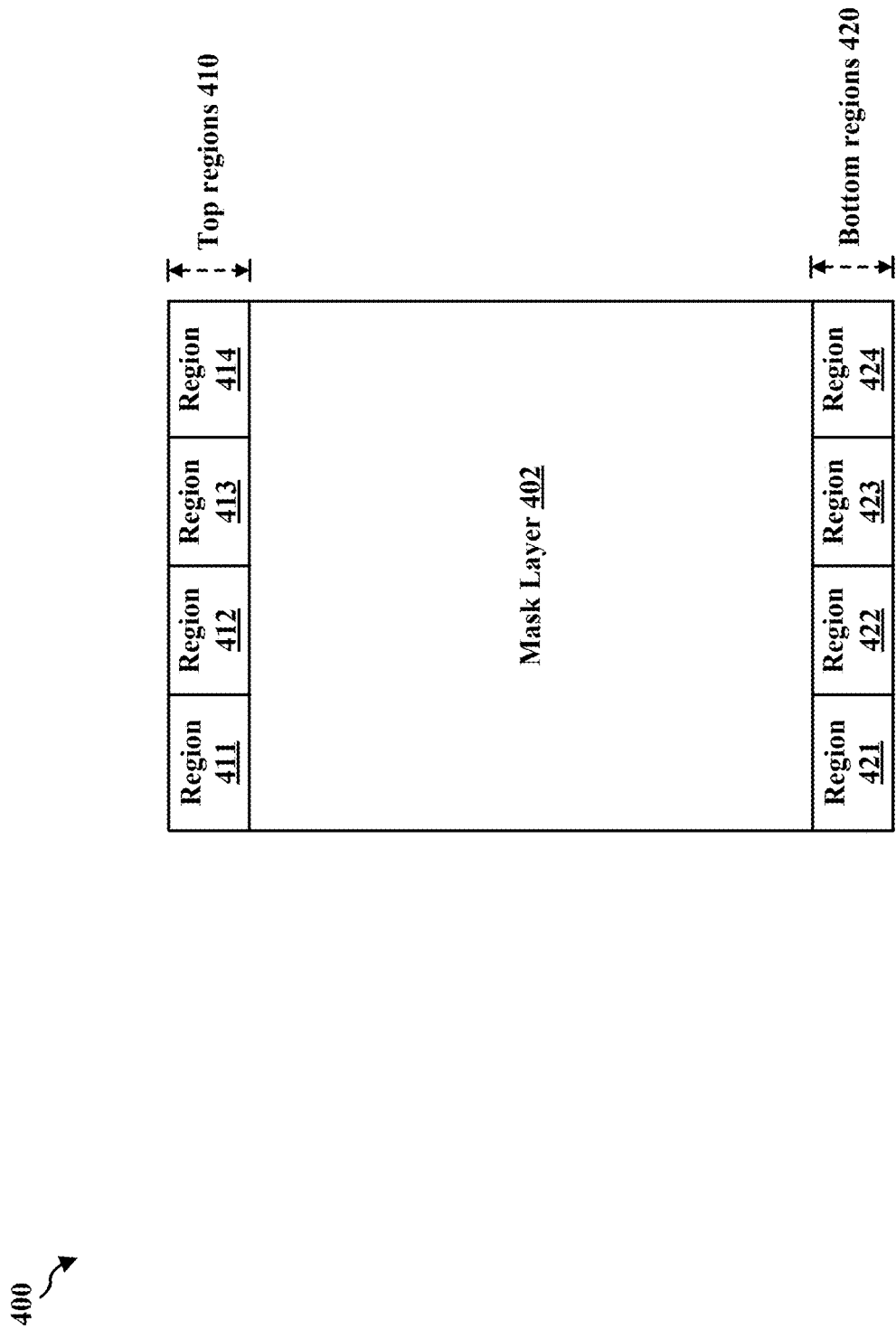
FIG. 4 is a diagram illustrating an example mask layer for display processing.

FIG. 4 is a diagram 400 illustrating an example mask layer for display processing. More specifically, diagram 400 depicts one type of mask layer that may represent portions of a display panel. As shown in FIG. 4, diagram 400 includes mask layer 402 including top regions 410 and bottom regions 420. Top regions 410 include region 411, region 412, region 413, and region 414, and bottom regions 420 include region 421, region 422, region 423, and region 424. As depicted in FIG. 4, mask layer 402 may represent the different regions that are displayed on a display panel.

Some types of displays may use a certain type of mask layer (e.g., a shape mask layer) to reshape a display frame. For instance, a mask layer may reshape the display frame to provide more optimized visual shapes at the display panel (e.g., improved round corners, improved circular shape, improved rectangular shape, etc.). These types of mask layers (e.g., shape mask layers) may be processed by software (e.g., graphics processing unit (GPU) software or central processing unit (CPU) software) or by hardware (e.g., display processing unit (DPU) hardware). Also, these mask layers may be processed by other specific types of hardware logic modules (e.g., modules in a display driver integrated circuit (DDIC) or bridge chips). In some aspects, these types of mask layers (e.g., shape mask layers) may be based on certain unit, such as a pixel. That is, the shape generation basis unit of the shape mask layers may be a single pixel.

Some aspects of display processing may utilize a number of different locations for a display camera. For instance, an under-display camera (i.e., a camera that is located beneath at least one display layer in a device) is one example of a camera location design in modern smart phones and mobile handset devices. The location of the display camera may be selected based on a number of different categories, such as convenience and visual quality improvement. Additionally, in order to optimize camera visual quality, a camera exposure time and a display lighting time may be time division multiplexed (TDM'd). By time division multiplexing the camera exposure time and the display lighting time, this may help to optimize a camera visual quality by reducing the amount of display lightning interferences. This may be accomplished by utilizing a fixed time division duplexing (TDD) duty cycle for both the camera exposure time (i.e., the camera duty cycle) and the display lighting time (i.e., the display duty cycle). For example, the camera duty cycle may be a fixed camera TDD duty cycle and the display duty cycle may be a fixed display TDD duty cycle.

Figure 5:
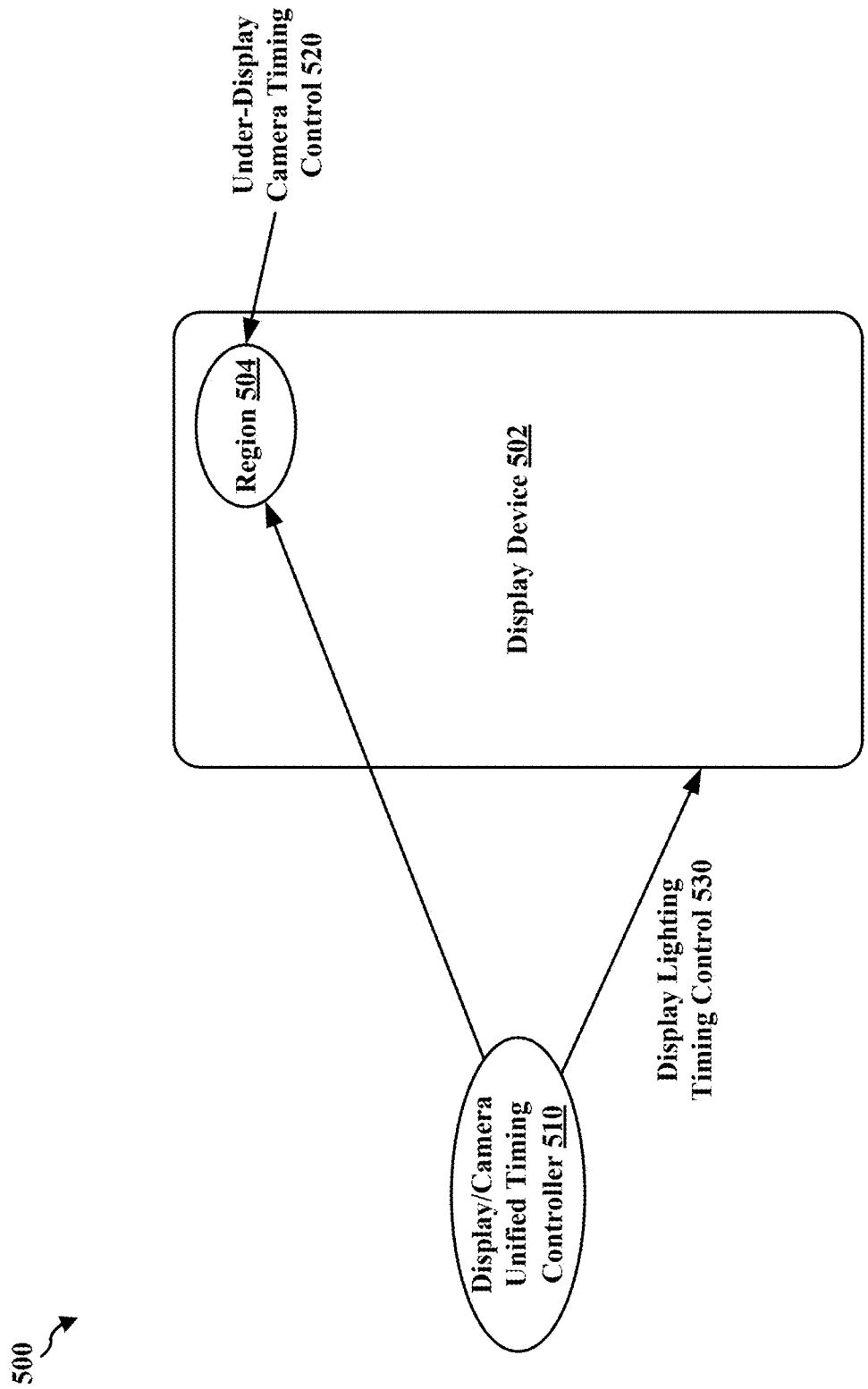
FIG. 5 is a diagram illustrating an example display timing and camera timing for display processing.

FIG. 5 is a diagram 500 illustrating an example of display timing and camera timing at a display device. More specifically, diagram 500 depicts display device 502 including a display/camera unified timing controller 510. As shown in FIG. 5, diagram 500 includes display device 502, region 504, display/camera unified timing controller 510, under-display camera timing control 520, and display lighting timing control 530. FIG. 5 illustrates that the display timing (i.e., the display lighting time and/or the display duty cycle) and the camera timing (i.e., the camera exposure time and/or the camera duty cycle) may be synchronized under display/camera unified timing controller 510. That is, FIG. 5 depicts a fixed camera duty cycle and a fixed display duty cycle that are unified and synchronized together. As depicted in FIG. 5, the under-display camera timing control 520 is located near the region 504 in display device 502 (e.g., the location of an under-display camera in display device 502).

As indicated above, the camera duty cycle and the display duty cycle may be finely tuned as TDD duty cycles. For instance, the camera duty cycle and the display duty cycle may be finely tuned and fixed in a predetermined location, e.g., a lab. Further, the camera duty cycle and the display duty cycle may be fixed as constant time periods (i.e., constant duty cycles). This type of constant duty cycle may be relatively easy to implement, but it may not be an ideal solution as both the display lighting time and the camera exposure time may need to be increased or decreased in order to produce an improved visual quality. Indeed, the constant duty cycle may not allow for dynamic configurations of the display lighting time and/or the camera exposure time. For example, the camera may need an increased exposure time while the display may need an increased lightning time in order to increase display brightness. Moreover, the display may need a decreased lightning time in order to reduce display burning and aging (e.g., organic light-emitting diode (OLED) burning and aging). However, in some scenarios (e.g., indoor environments, outdoor environments, and dark lighting scenarios), the fixed TDD duty cycle may not be a detriment to both the camera and the display.

Figure 6:
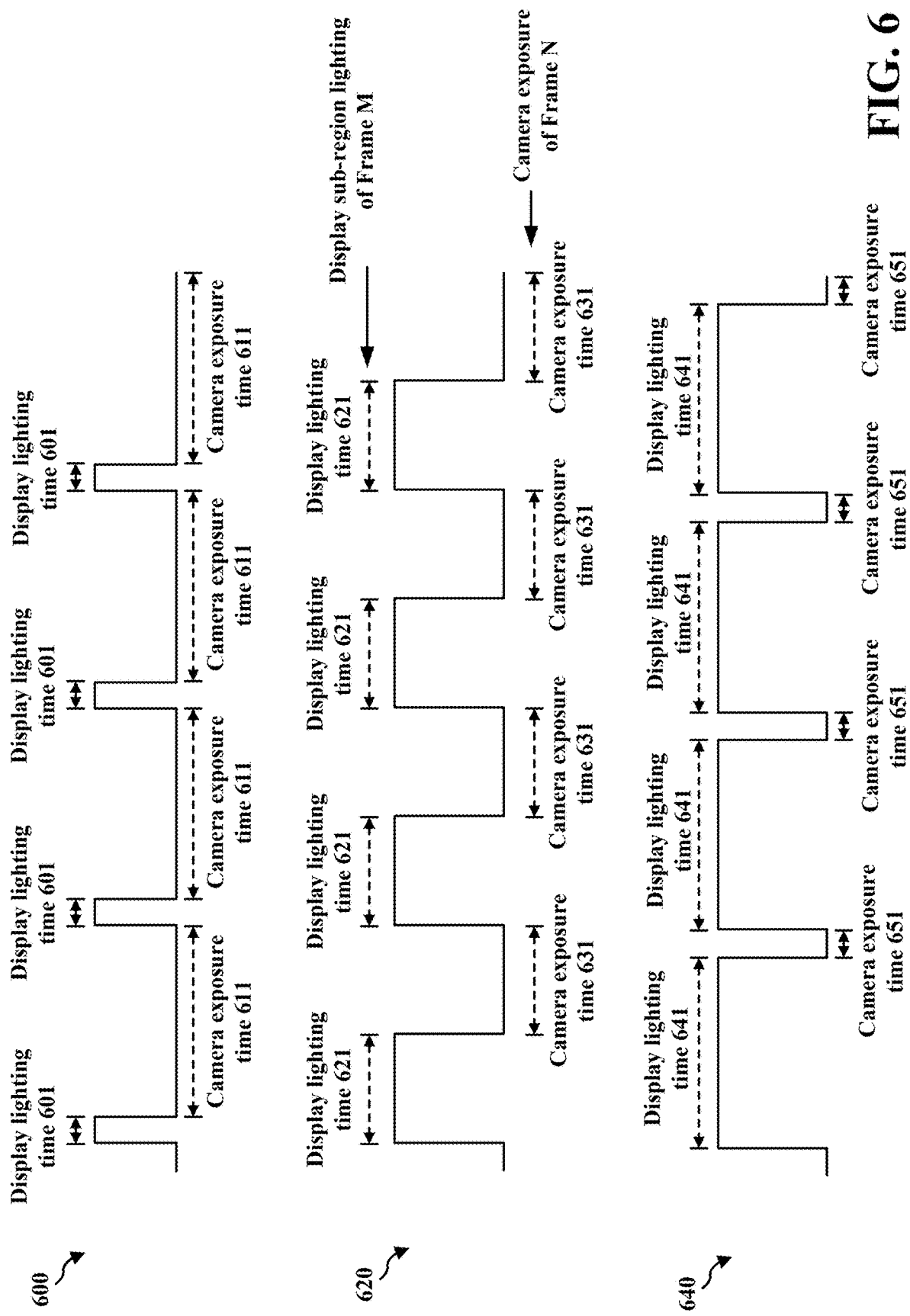
FIG. 6 is a diagram illustrating example display lighting times and camera exposure times for display processing.

FIG. 6 includes diagram 600, diagram 620, and diagram 640 illustrating examples of different fixed display lighting times and camera exposure times. More specifically, diagrams 600/620/640 display decreasing camera exposure times and corresponding increasing display lighting times. As shown in FIG. 6, diagram 600 includes display lighting time 601 (i.e., display duty cycle) and camera exposure time 611 (i.e., camera duty cycle). Display lighting time 601 is a fixed display lighting time including a relatively short display duty cycle, and camera exposure time 611 is a fixed camera exposure time including a relatively long camera duty cycle. As further shown in FIG. 6, diagram 620 includes display lighting time 621 (i.e., display duty cycle) and camera exposure time 631 (i.e., camera duty cycle). Display lighting time 621 is a fixed display lighting time including a display duty cycle that is approximately equal to the camera duty cycle of camera exposure time 631 (i.e., a fixed camera exposure time). Diagram 620 also shows that display lighting time 621 corresponds to a display sub-region lighting of a certain frame (e.g., frame M), and camera exposure time 631 corresponds to a camera exposure of a certain frame (e.g., frame N). As further shown in FIG. 6, diagram 640 includes display lighting time 641 (i.e., display duty cycle) and camera exposure time 651 (i.e., camera duty cycle). Display lighting time 641 is a fixed display lighting time including a relatively long display duty cycle, and camera exposure time 651 is a fixed camera exposure time including a relatively short camera duty cycle.

As indicated above, one challenge of working with certain types of display cameras (e.g., under-display cameras) is that the visual quality of the camera and the display may not be ideal when utilizing time division multiplexing. For instance, in order for the display to work properly when the display is turned on, the camera may need to be turned off. Likewise, in order for the camera to work properly and when the camera is activated, the display may need to be turned off. Further, due to switching between the activation of the display and the activation of the camera, the camera may not receive enough exposure time and the display may not receive enough display lighting time. Accordingly, based on the above, it may be beneficial to utilize a camera duty cycle and a display duty cycle that are dynamic or adjustable. For instance, it may be beneficial to utilize a camera duty cycle that is an adjustable time division duplexing (TDD) camera duty cycle and a display duty cycle that is an adjustable TDD display duty cycle. It may also be beneficial to utilize an adjustable switching frequency for the camera and/or the display.

Aspects of the present disclosure may utilize a camera duty cycle and a display duty cycle that are dynamic or adjustable. For instance, aspects of the present disclosure may utilize a camera duty cycle that is an adjustable time division duplexing (TDD) camera duty cycle and a display duty cycle that is an adjustable TDD display duty cycle.

Additionally, in some instances, aspects of the present disclosure may utilize an adjustable switching frequency for the camera and/or display. For example, aspects of the present disclosure may utilize an adjustable switching frequency based on an ambient light sensor (ALS) value for a camera run time and a display run time. That is, aspects presented herein may utilize an adaptive TDD regional duty cycle for ambient light and/or an exposure time. Moreover, aspects presented herein may utilize an adaptive display run time calibration.

In some instances, aspects of the present disclosure may utilize a TDD duty cycle of a camera and a TDD duty cycle of a display that dynamically changes along with an ambient light sensor (ALS) value. The ALS value may be obtained from an ambient light sensor (e.g., an ambient light sensor located in a camera) or a camera sensor. Before the camera starts to capture a picture or starts a preview, aspects presented herein may obtain a latest ALS value from an ALS sensor. Also, before a camera session begins, a display duty cycle may be a certain value (e.g., a value of 100%). Depending on the current ALS value, aspects presented herein may determine a camera duty cycle and a display duty cycle (e.g., a display initiate duty cycle). After determining the camera duty cycle and the display duty cycle, aspects presented herein may initiate or open a camera sensor. In some environments, e.g., outdoor environments, a camera may have a reduced duty cycle compared to the duty cycle of a display (i.e., the display may have an increased duty cycle compared to the camera). In other environments, e.g., indoor environments, a camera may have an increased duty cycle and compared to the duty cycle of a display (i.e., the display may have a reduced duty cycle compared to the camera).

In some aspects, during a camera run time, aspects presented herein may dynamically change a camera duty cycle and/or a display duty cycle. For example, aspects presented herein may dynamically change a camera TDD duty cycle and/or a display TDD duty cycle according to an average picture expose time. Additionally, a margin time may be added after each time a display is switched from on to off (i.e., switched from display-on to display-off). The margin time may be a camera margin time and/or a display margin time. Also, the camera margin time may be inserted prior to a camera on-time and/or the display margin time may be inserted prior to a display on-time. Further, the margin time (i.e., camera margin time and/or display margin time) may be changed along with a dynamic TDD cycle. In some instances, the margin time may be tuned or adjusted prior to the camera on-time or the display on-time (e.g., the margin time factors may be tuned in a lab). For example, the display cycle may be 30% of the cycle and the camera cycle may be 65% of the cycle. Accordingly, in some examples, there may be a certain timing margin for switching (e.g., a 5% timing margin for switching). Also, if the display cycle is 10% of the cycle, and the camera cycle is 88% of the cycle, there may be a 2% timing margin for switching.

In some instances, along with adjustments in a display duty cycle, the display color and display brightness may be adjusted. To compensate for this adjustment, aspects presented herein may increase/decrease certain pixel values (e.g., pixel brightness values or pixel color values). For instance, the pixel brightness/color values may be adjusted when the camera is off in order to compensate for any luminance loss. In some aspects, such as to shift pixel color values, aspects presented herein may calibrate a display using different parameters (e.g., color parameters and gamma calibration parameters). In order to shift the color values, aspects presented herein may map the color values from one color space to another color space (e.g., map the color values from a red (r) green (g) blue (b) (RGB) color space to a R'G'B' color space. These color spaces may be mapped using three-dimensional (3D) lookup tables (LUTs). For example, a 3D LUT may map a certain color space value (e.g., 100,100,121) to another color space value (e.g., 99, 03, 106). When mapping color space values using 3D LUTs, a duty calibration parameter may be set at a certain value (e.g., 20% duty calibration parameter) for a certain 3D LUT (e.g., 3D LUT 0). Also, the duty calibration parameter may be set at another value (e.g., 50% duty calibration parameter) for another 3D LUT (e.g., 3D LUT 1).

In some aspects, in order to shift pixel brightness values, aspects presented herein may calibrate a display using certain values (e.g., a brightness adjustment ratio). Aspects presented herein may also utilize different gamma tables to perform the calibration. For a certain gamma table, aspects presented herein may utilize different pixel brightness values to perform the calibration. For example, for gamma table A, aspects presented herein may perform the calibration based on a pixel brightness value of 20% and a brightness adjustment ratio. Also, for gamma table B, aspects presented herein may perform the calibration based on a pixel brightness value of 50% and the brightness adjustment ratio. Moreover, in order to dynamically adjust the duty cycles (e.g., a camera TDD duty cycle and a display TDD duty cycle), aspects presented herein may apply different calibration parameters to the display. For example, in order to dynamically adjust the duty cycles, aspects presented herein may apply a three-dimensional (3D) lookup table (LUT) parameter, a brightness adjustment ratio parameter, and/or a gamma table parameter.

Figure 7:
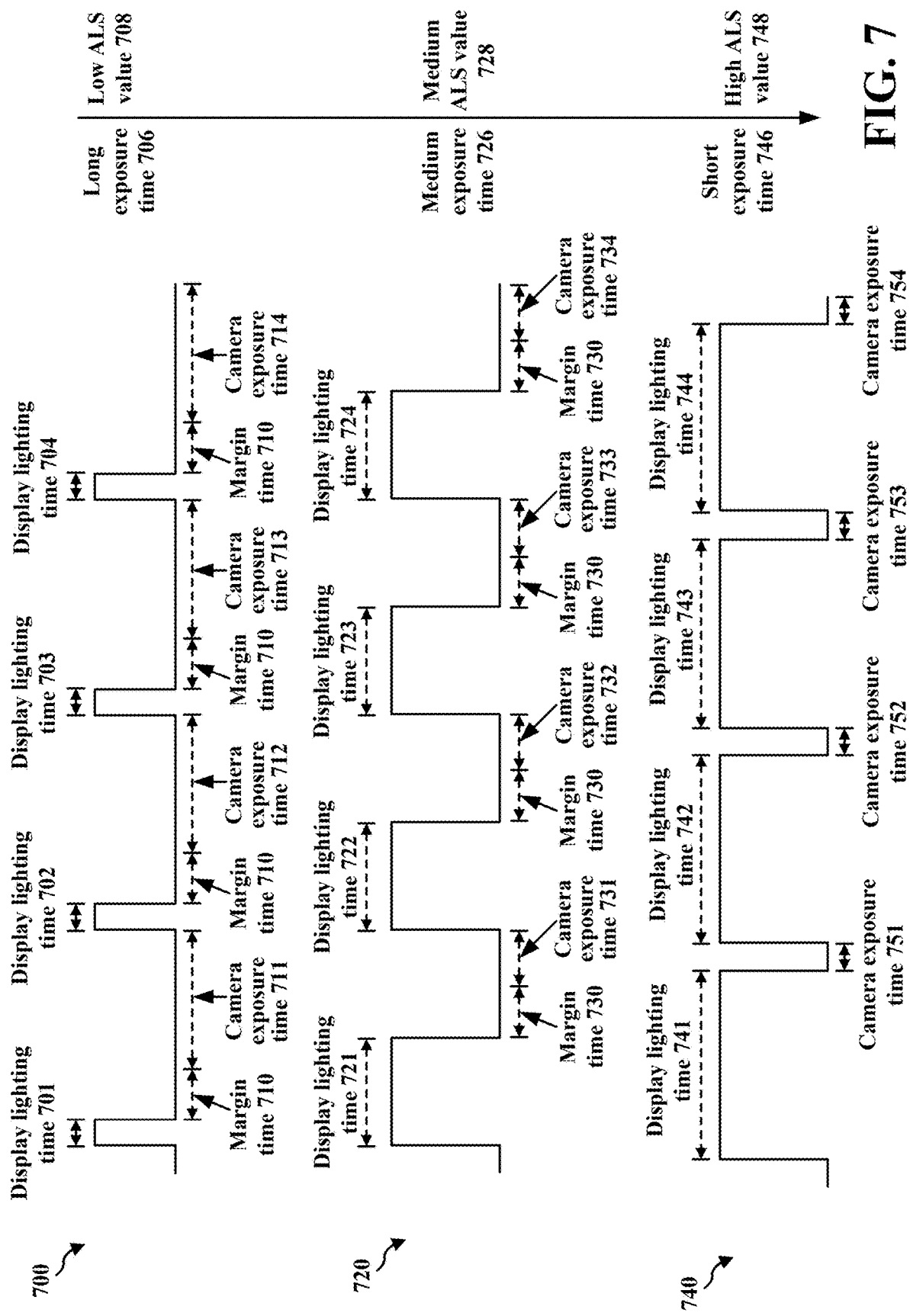
FIG. 7 is a diagram illustrating example display lighting times and camera exposure times for display processing.

FIG. 7 includes diagram 700, diagram 720, and diagram 740 illustrating examples of adjustable display lighting times and adjustable camera exposure times. More specifically, diagrams 700/720/740 display decreasing dynamic camera exposure times and corresponding increasing dynamic display lighting times. As shown in FIG. 7, diagram 700 includes display lighting time 701 (i.e., display duty cycle), display lighting time 702, display lighting time 703, and display lighting time 704. Also, diagram 700 includes camera exposure time 711 (i.e., camera duty cycle), camera exposure time 712, camera exposure time 713, and camera exposure time 714. Display lighting times 701-704 are adjustable display lighting times including a relatively short display duty cycle, and camera exposure times 711-714 are adjustable camera exposure times including a relatively long camera duty cycle. For example, diagram 700 includes a long exposure time 706 and a low ALS value 708. Further, as the camera exposure times are adjustable, margin time 710 is inserted before each of camera exposure times 711-714. The margin time 710 may allow the display to turn off before the camera is activated, as well as allow the camera to turn off before the display is activated.

As further shown in FIG. 7, diagram 720 includes display lighting time 721 (i.e., display duty cycle), display lighting time 722, display lighting time 723, and display lighting time 724. Also, diagram 720 includes camera exposure time 731 (i.e., camera duty cycle), camera exposure time 732, camera exposure time 733, and camera exposure time 734. Display lighting times 721-724 are adjustable display lighting times including a medium display duty cycle that is greater than display lighting times 701-704. For example, diagram 720 includes a medium exposure time 726 and a medium ALS value 728. Moreover, as the camera exposure times are adjustable, margin time 730 is inserted before each of camera exposure times 731-734. The margin time 730 may allow the display to turn off before the camera is activated, as well as allow the camera to turn off before the display is activated. As further shown in FIG. 7, diagram 740 includes display lighting time 741 (i.e., display duty cycle), display lighting time 742, display lighting time 743, and display lighting time 744. Further, diagram 740 includes camera exposure time 751 (i.e., camera duty cycle), camera exposure time 752, camera exposure time 753, and camera exposure time 754. Display lighting times 741-744 are adjustable display lighting times including a relatively long display duty cycle that is greater than display lighting times 721-724. For example, diagram 740 includes a short exposure time 746 and a high ALS value 748.

Additionally, in some instances, aspects presented herein may include a number of different timing controls, such as a display regional TDD timing control. In a display regional TDD timing control, the display regions on the top of the camera may have a separate TDD timing controller. Also, these regions may have different display TDD duty cycles compared to a global display timing controller. In some instances, a specific region may be following a TDD cycle for a certain type of camera (e.g., an under-display camera) and may be affected by the TDD timing control. However, other global display regions may not be affected by the TDD timing control. This may help to avoid global display flickering and color shifts.

Figure 8:
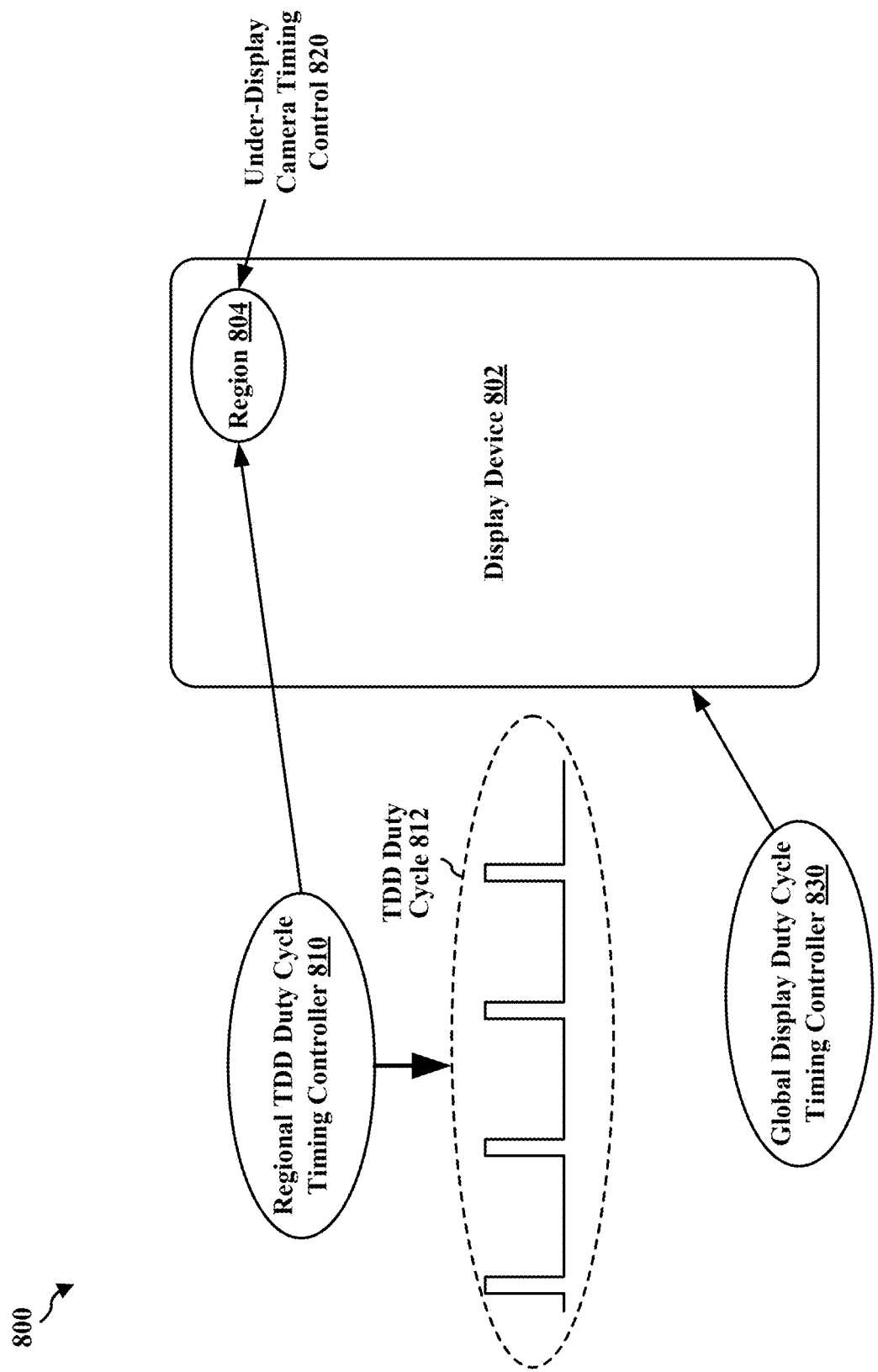
FIG. 8 is a diagram illustrating an example display timing and camera timing for display processing.

FIG. 8 is a diagram 800 illustrating an example of display timing and camera timing at a display device. More specifically, diagram 800 depicts display device 802 including a regional TDD duty cycle timing controller 810. As shown in FIG. 8, diagram 800 includes display device 802, region 804, regional TDD duty cycle timing controller 810, under-display camera timing control 820, and global display duty cycle timing controller 830. FIG. 8 illustrates that the display timing (i.e., the display lighting time or the display duty cycle) and the camera timing (i.e., the camera exposure time or the camera duty cycle) may be adjustable. That is, FIG. 8 depicts an adjustable camera duty cycle and an adjustable display duty cycle. The adjustable camera duty cycle and the adjustable display duty cycle may be controlled by regional TDD duty cycle timing controller 810 and global display duty cycle timing controller 830. FIG. 8 also shows an example of a TDD duty cycle 812 that corresponds to regional TDD duty cycle timing controller 810. As depicted in FIG. 8, the under-display camera timing control 820 is located near region 804 in display device 802 (e.g., the location of an under-display camera in display device 802).

As mentioned herein, aspects presented herein may utilize an ALS value to determine or initiate a duty cycle. Aspects presented herein may also utilize an expose time or a camera exposure time to determine a run time duty cycle. Further, aspects of the present disclosure may utilize a dynamic margin time adjustment along with a duty cycle adjustment. Aspects of the present disclosure may also utilize a dynamic display calibration for different TDD duty cycles. Moreover, aspects presented herein may utilize a regional TDD display timing controller, as well as a global display timing controller.

Aspects of the present disclosure may include a number of benefits or advantages. For instance, aspects of the present disclosure may optimize visual quality for both a camera and a display. By doing so, aspects presented herein may include the ability to match lightning environments based on the camera visual quality and the display visual quality. For example, for certain environments where the display may need to be brighter (e.g., outdoor environments), aspects presented herein may allow more time for the display lighting time and less time for the camera exposure time. For other environments where the camera may need more exposure time (e.g., indoor environments), aspects presented herein may allow more time for the camera exposure time and less time for the display lighting time. Accordingly, aspects presented herein may provide an adjustable camera exposure time and an adjustable display lighting time.

Figure 9:
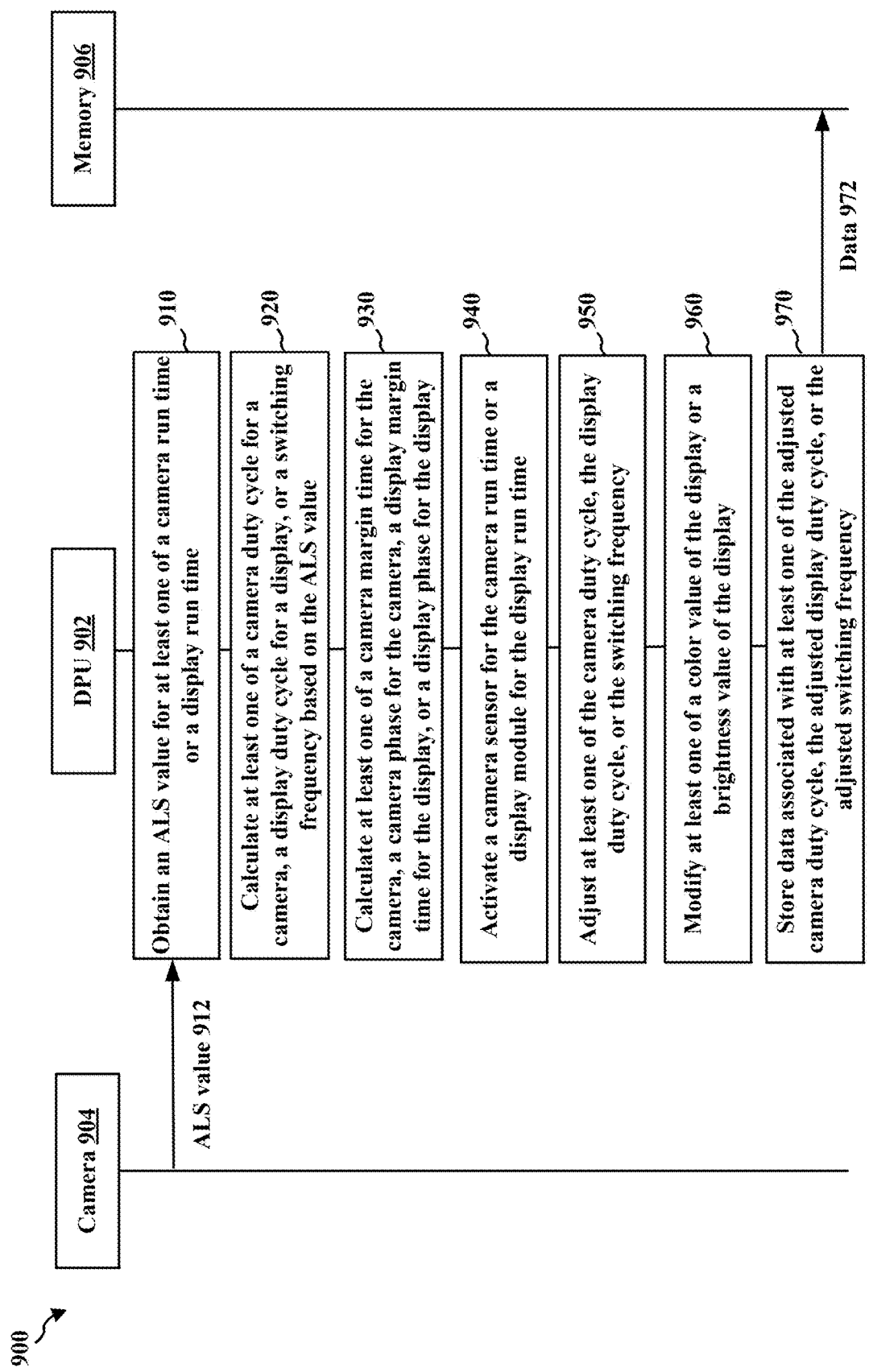
FIG. 9 is a communication flow diagram illustrating example communications between a camera, a DPU, and a memory.

FIG. 9 is a communication flow diagram 900 of display processing in accordance with one or more techniques of this disclosure. As shown in FIG. 9, diagram 900 includes example communications between DPU 902 (or other display processor), camera 904, and memory 906 (e.g., a device storage), in accordance with one or more techniques of this disclosure.

At 910, DPU 902 may obtain an ambient light sensor (ALS) value for at least one of a camera run time or a display run time (e.g., obtain ALS value 912 from camera 904). The ALS value may be obtained from an ALS sensor in a camera or a camera sensor in a camera.

At 920, DPU 902 may calculate at least one of a camera duty cycle for a camera, a display duty cycle for a display, or a switching frequency based on the ALS value. The camera may be an under-display camera in the display or an above-display camera in the display, or the camera may be adjacent to the display.

At 930, DPU 902 may calculate at least one of the camera margin time for the camera, a camera phase for the camera, the display margin time for the display, or a display phase for the display, where at least one of the camera duty cycle, the display duty cycle, or the switching frequency is adjusted based on at least the calculated camera margin time, the calculated camera phase, the calculated display margin time, or the calculated display phase.

At 940, DPU 902 may activate a camera sensor for the camera run time or a display module for the display run time based on at least one of the camera duty cycle, the display duty cycle, the switching frequency, the camera margin time, or the display margin time, where at least one of the camera duty cycle, the display duty cycle, or the switching frequency is adjusted based on the activated camera sensor or the activated display module. The camera duty cycle may correspond to the camera sensor and the display duty cycle may correspond to the display module, and the camera sensor may be associated with a camera timing controller and the display module may be associated with a display timing controller. The camera timing controller may be a time division duplexing (TDD) camera timing controller, and the display timing controller may be at least one of a regional TDD display timing controller or a global display timing controller.

At 950, DPU 902 may adjust at least one of the camera duty cycle, the display duty cycle, or the switching frequency based on at least one of the camera run time, the display run time, the ALS value, a camera margin time, or a display margin time. In some aspects, the camera duty cycle may be adjusted based on a combination of the camera run time and the camera margin time. The combination of the camera run time and the camera margin time may include inserting the camera margin time prior to the camera run time based on an average exposure time during the camera run time. In some instances, the display duty cycle may be adjusted based on a combination of the display run time and the display margin time. The combination of the display run time and the display margin time may include inserting the display margin time prior to the display run time based on an average lighting time during the display run time.

In some aspects, the camera margin time may be based on an activation of the camera or a deactivation of the camera, and the display margin time may be based on an activation of the display or a deactivation of the display. Also, at least one of the camera duty cycle, the display duty cycle, or the switching frequency may be adjusted based on one or more calibration parameters, and the one or more calibration parameters may include at least one of a three-dimensional (3D) lookup table (LUT) parameter, a brightness adjustment ratio parameter, or a gamma table parameter. The camera duty cycle may be a time division duplexing (TDD) camera duty cycle and the display duty cycle may be a TDD display duty cycle. Further, at least one of the camera duty cycle, the display duty cycle, or the switching frequency may be adjusted by a display processing unit (DPU) or a display processor.

At 960, DPU 902 may modify at least one of a color value of the display or a brightness value of the display based on at least one of an activation of the display, a deactivation of the display, an activation of the camera, or a deactivation of the camera.

At 970, DPU 902 may store, in a memory or a buffer, data associated with at least one of the adjusted camera duty cycle, the adjusted display duty cycle, or the adjusted switching frequency (e.g., store data 972 in memory 906).

Figure 10:
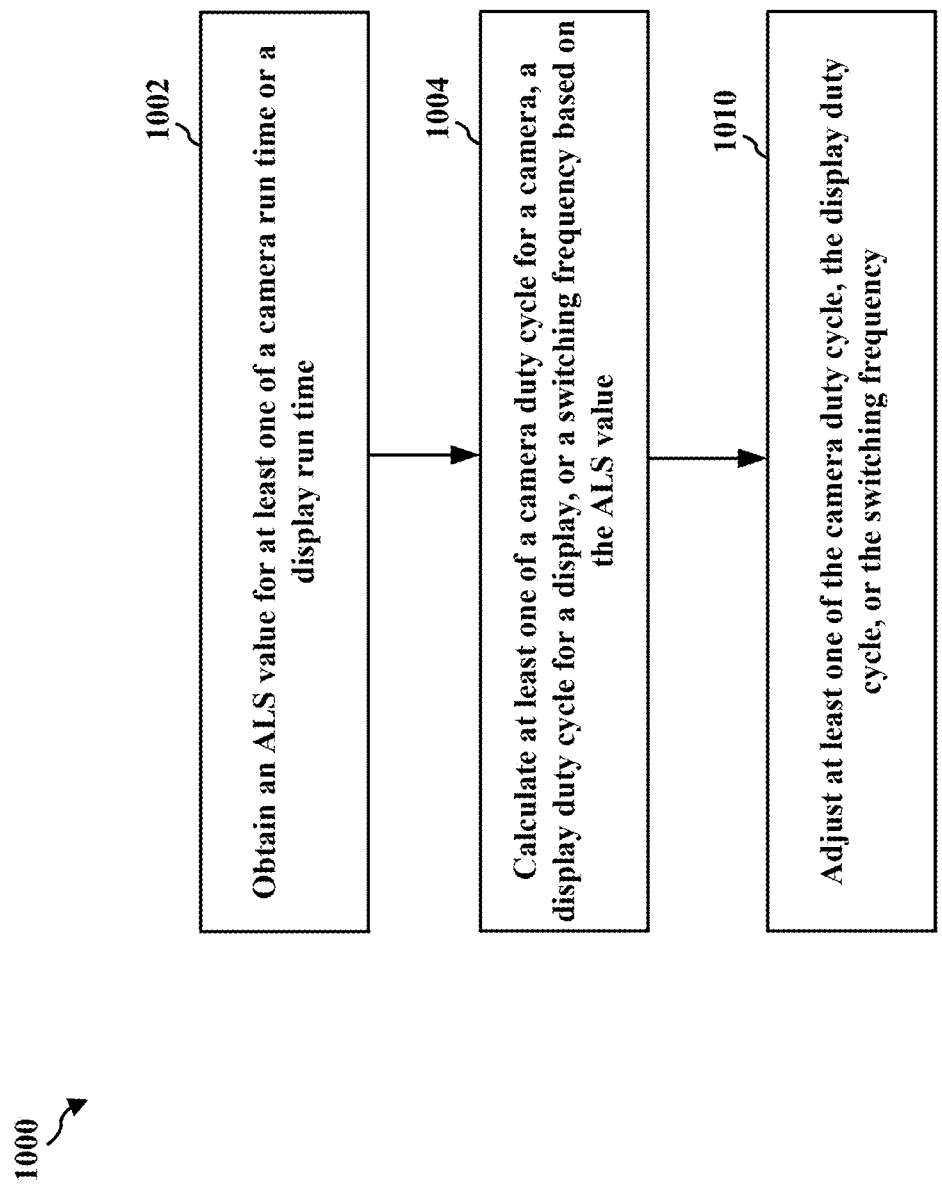
FIG. 10 is a flowchart of an example method of display processing.

FIG. 10 is a flowchart 1000 of an example method of display processing in accordance with one or more techniques of this disclosure. The method may be performed by a DPU, a DDIC, an apparatus for display processing, a display processor, a wireless communication device, and/or any apparatus that may perform display processing as used in connection with the examples of FIGS. 1-9.

At 1002, the DPU may obtain an ambient light sensor (ALS) value for at least one of a camera run time or a display run time, as described in connection with the examples in FIGS. 1-9. For example, as described in 910 of FIG. 9, DPU 902 may obtain an ambient light sensor (ALS) value for at least one of a camera run time or a display run time. Further, step 1002 may be performed by display processor 127 in FIG. 1. The ALS value may be obtained from an ALS sensor in a camera or a camera sensor in a camera.

At 1004, the DPU may calculate at least one of a camera duty cycle for a camera, a display duty cycle for a display, or a switching frequency based on the ALS value, as described in connection with the examples in FIGS. 1-9. For example, as described in 920 of FIG. 9, DPU 902 may calculate at least one of a camera duty cycle for a camera, a display duty cycle for a display, or a switching frequency based on the ALS value. Further, step 1004 may be performed by display processor 127 in FIG. 1. The camera may be an under-display camera in the display or an above-display camera in the display, or the camera may be adjacent to the display.

At 1010, the DPU may adjust at least one of the camera duty cycle, the display duty cycle, or the switching frequency based on at least one of the camera run time, the display run time, the ALS value, a camera margin time, or a display margin time, as described in connection with the examples in FIGS. 1-9. For example, as described in 950 of FIG. 9, DPU 902 may adjust at least one of the camera duty cycle, the display duty cycle, or the switching frequency based on at least one of the camera run time, the display run time, the ALS value, a camera margin time, or a display margin time. Further, step 1010 may be performed by display processor 127 in FIG. 1. In some aspects, the camera duty cycle may be adjusted based on a combination of the camera run time and the camera margin time. The combination of the camera run time and the camera margin time may include inserting the camera margin time prior to the camera run time based on an average exposure time during the camera run time. In some instances, the display duty cycle may be adjusted based on a combination of the display run time and the display margin time. The combination of the display run time and the display margin time may include inserting the display margin time prior to the display run time based on an average lighting time during the display run time.

In some aspects, the camera margin time may be based on an activation of the camera or a deactivation of the camera, and the display margin time may be based on an activation of the display or a deactivation of the display. Also, at least one of the camera duty cycle, the display duty cycle, or the switching frequency may be adjusted based on one or more calibration parameters, and the one or more calibration parameters may include at least one of a three-dimensional (3D) lookup table (LUT) parameter, a brightness adjustment ratio parameter, or a gamma table parameter. The camera duty cycle may be a time division duplexing (TDD) camera duty cycle and the display duty cycle may be a TDD display duty cycle. Further, at least one of the camera duty cycle, the display duty cycle, or the switching frequency may be adjusted by a display processing unit (DPU) or a display processor.

Figure 11:
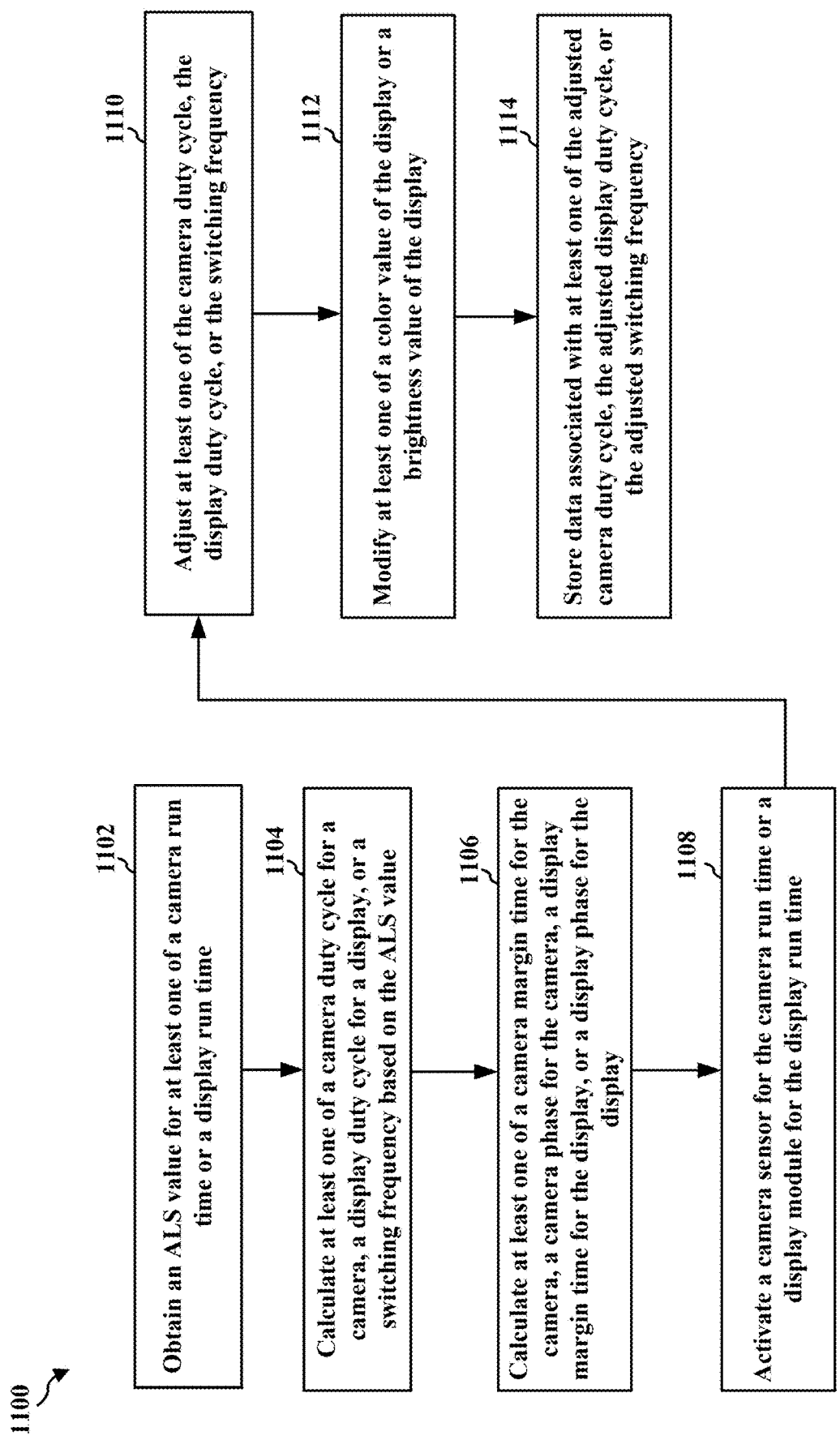
FIG. 11 is a flowchart of an example method of display processing.

FIG. 11 is a flowchart 1100 of an example method of display processing in accordance with one or more techniques of this disclosure. The method may be performed by a DPU, a DDIC, an apparatus for display processing, a display processor, a wireless communication device, and/or any apparatus that may perform display processing as used in connection with the examples of FIGS. 1-9.

At 1102, the DPU may obtain an ambient light sensor (ALS) value for at least one of a camera run time or a display run time, as described in connection with the examples in FIGS. 1-9. For example, as described in 910 of FIG. 9, DPU 902 may obtain an ambient light sensor (ALS) value for at least one of a camera run time or a display run time. Further, step 1102 may be performed by display processor 127 in FIG. 1. The ALS value may be obtained from an ALS sensor in a camera or a camera sensor in a camera.

At 1104, the DPU may calculate at least one of a camera duty cycle for a camera, a display duty cycle for a display, or a switching frequency based on the ALS value, as described in connection with the examples in FIGS. 1-9. For example, as described in 920 of FIG. 9, DPU 902 may calculate at least one of a camera duty cycle for a camera, a display duty cycle for a display, or a switching frequency based on the ALS value. Further, step 1104 may be performed by display processor 127 in FIG. 1. The camera may be an under-display camera in the display or an above-display camera in the display, or the camera may be adjacent to the display.

At 1106, the DPU may calculate at least one of the camera margin time for the camera, a camera phase for the camera, the display margin time for the display, or a display phase for the display, where at least one of the camera duty cycle, the display duty cycle, or the switching frequency is adjusted based on at least the calculated camera margin time, the calculated camera phase, the calculated display margin time, or the calculated display phase, as described in connection with the examples in FIGS. 1-9. For example, as described in 930 of FIG. 9, DPU 902 may calculate at least one of the camera margin time for the camera, a camera phase for the camera, the display margin time for the display, or a display phase for the display, where at least one of the camera duty cycle, the display duty cycle, or the switching frequency is adjusted based on at least the calculated camera margin time, the calculated camera phase, the calculated display margin time, or the calculated display phase. Further, step 1106 may be performed by display processor 127 in FIG. 1.

At 1108, the DPU may activate a camera sensor for the camera run time or a display module for the display run time based on at least one of the camera duty cycle, the display duty cycle, the switching frequency, the camera margin time, or the display margin time, where at least one of the camera duty cycle, the display duty cycle, or the switching frequency is adjusted based on the activated camera sensor or the activated display module, as described in connection with the examples in FIGS. 1-9. For example, as described in 940 of FIG. 9, DPU 902 may activate a camera sensor for the camera run time or a display module for the display run time based on at least one of the camera duty cycle, the display duty cycle, the switching frequency, the camera margin time, or the display margin time, where at least one of the camera duty cycle, the display duty cycle, or the switching frequency is adjusted based on the activated camera sensor or the activated display module. Further, step 1108 may be performed by display processor 127 in FIG. 1. The camera duty cycle may correspond to the camera sensor and the display duty cycle may correspond to the display module, and the camera sensor may be associated with a camera timing controller and the display module may be associated with a display timing controller. The camera timing controller may be a time division duplexing (TDD) camera timing controller, and the display timing controller may be at least one of a regional TDD display timing controller or a global display timing controller.

At 1110, the DPU may adjust at least one of the camera duty cycle, the display duty cycle, or the switching frequency based on at least one of the camera run time, the display run time, the ALS value, a camera margin time, or a display margin time, as described in connection with the examples in FIGS. 1-9. For example, as described in 950 of FIG. 9, DPU 902 may adjust at least one of the camera duty cycle, the display duty cycle, or the switching frequency based on at least one of the camera run time, the display run time, the ALS value, a camera margin time, or a display margin time. Further, step 1110 may be performed by display processor 127 in FIG. 1. In some aspects, the camera duty cycle may be adjusted based on a combination of the camera run time and the camera margin time. The combination of the camera run time and the camera margin time may include inserting the camera margin time prior to the camera run time based on an average exposure time during the camera run time. In some instances, the display duty cycle may be adjusted based on a combination of the display run time and the display margin time. The combination of the display run time and the display margin time may include inserting the display margin time prior to the display run time based on an average lighting time during the display run time.

In some aspects, the camera margin time may be based on an activation of the camera or a deactivation of the camera, and the display margin time may be based on an activation of the display or a deactivation of the display. Also, at least one of the camera duty cycle, the display duty cycle, or the switching frequency may be adjusted based on one or more calibration parameters, and the one or more calibration parameters may include at least one of a three-dimensional (3D) lookup table (LUT) parameter, a brightness adjustment ratio parameter, or a gamma table parameter. The camera duty cycle may be a time division duplexing (TDD) camera duty cycle and the display duty cycle may be a TDD display duty cycle. Further, at least one of the camera duty cycle, the display duty cycle, or the switching frequency may be adjusted by a display processing unit (DPU) or a display processor.

At 1112, the DPU may modify at least one of a color value of the display or a brightness value of the display based on at least one of an activation of the display, a deactivation of the display, an activation of the camera, or a deactivation of the camera, as described in connection with the examples in FIGS. 1-9. For example, as described in 960 of FIG. 9, DPU 902 may modify at least one of a color value of the display or a brightness value of the display based on at least one of an activation of the display, a deactivation of the display, an activation of the camera, or a deactivation of the camera. Further, step 1112 may be performed by display processor 127 in FIG. 1.

At 1114, the DPU may store, in a memory or a buffer, data associated with at least one of the adjusted camera duty cycle, the adjusted display duty cycle, or the adjusted switching frequency, as described in connection with the examples in FIGS. 1-9. For example, as described in 970 of FIG. 9, DPU 902 may store, in a memory or a buffer, data associated with at least one of the adjusted camera duty cycle, the adjusted display duty cycle, or the adjusted switching frequency. Further, step 1114 may be performed by display processor 127 in FIG. 1.

In configurations, a method or an apparatus for display processing is provided. The apparatus may be a DPU, a DDIC, a display processor, or some other processor that may perform display processing. In aspects, the apparatus may be the display processor 127 within the device 104, or may be some other hardware within the device 104 or another device. The apparatus, e.g., display processor 127, may include means for obtaining an ambient light sensor (ALS) value for at least one of a camera run time or a display run time; means for calculating at least one of a camera duty cycle for a camera, a display duty cycle for a display, or a switching frequency based on the ALS value; means for adjusting at least one of the camera duty cycle, the display duty cycle, or the switching frequency based on at least one of the camera run time, the display run time, the ALS value, a camera margin time, or a display margin time; means for activating a camera sensor for the camera run time or a display module for the display run time based on at least one of the camera duty cycle, the display duty cycle, the switching frequency, the camera margin time, or the display margin time, where at least one of the camera duty cycle, the display duty cycle, or the switching frequency is adjusted based on the activated camera sensor or the activated display module; means for calculating at least one of the camera margin time for the camera, a camera phase for the camera, the display margin time for the display, or a display phase for the display, where at least one of the camera duty cycle, the display duty cycle, or the switching frequency is adjusted based on at least the calculated camera margin time, the calculated camera phase, the calculated display margin time, or the calculated display phase; means for modifying at least one of a color value of the display or a brightness value of the display based on at least one of an activation of the display, a deactivation of the display, an activation of the camera, or a deactivation of the camera; and means for storing, in a memory or a buffer, data associated with at least one of the adjusted camera duty cycle, the adjusted display duty cycle, or the adjusted switching frequency.

The subject matter described herein may be implemented to realize one or more benefits or advantages. For instance, the described display processing techniques may be used by a DPU, a display processor, or some other processor that may perform display processing to implement the dynamic configuration of display optimization techniques described herein. This may also be accomplished at a low cost compared to other display processing techniques. Moreover, the display processing techniques herein may improve or speed up data processing or execution. Further, the display processing techniques herein may improve resource or data utilization and/or resource efficiency. Additionally, aspects of the present disclosure may utilize dynamic configuration of display optimization techniques in order to improve memory bandwidth efficiency and/or increase processing speed at a DPU.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

In accordance with this disclosure, the term "or" may be interpreted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that may be accessed by one or more computers or one or more processors to retrieve instructions, code and/or data structures for implementation of the techniques described in this disclosure. By way of example, and not limitation, such computer-readable media may comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is an apparatus for display processing including at least one processor coupled to a memory and configured to: obtain an ambient light sensor (ALS) value for at least one of a camera run time or a display run time; calculate at least one of a camera duty cycle for a camera, a display duty cycle for a display, or a switching frequency based on the ALS value; and adjust at least one of the camera duty cycle, the display duty cycle, or the switching frequency based on at least one of the camera run time, the display run time, the ALS value, a camera margin time, or a display margin time.

Aspect 2 is the apparatus of aspect 1, where the at least one processor is further configured to: activate a camera sensor for the camera run time or a display module for the display run time based on at least one of the camera duty cycle, the display duty cycle, the switching frequency, the camera margin time, or the display margin time, where at least one of the camera duty cycle, the display duty cycle, or the switching frequency is adjusted based on the activated camera sensor or the activated display module.

Aspect 3 is the apparatus of any of aspects 1 and 2, where the camera duty cycle corresponds to the camera sensor and the display duty cycle corresponds to the display module, and where the camera sensor is associated with a camera timing controller and the display module is associated with a display timing controller.

Aspect 4 is the apparatus of any of aspects 1 to 3, where the camera timing controller is a time division duplexing (TDD) camera timing controller, and where the display timing controller is at least one of a regional TDD display timing controller or a global display timing controller.

Aspect 5 is the apparatus of any of aspects 1 to 4, where the at least one processor is further configured to: calculate at least one of the camera margin time for the camera, a camera phase for the camera, the display margin time for the display, or a display phase for the display, where at least one of the camera duty cycle, the display duty cycle, or the switching frequency is adjusted based on at least the calculated camera margin time, the calculated camera phase, the calculated display margin time, or the calculated display phase.

Aspect 6 is the apparatus of any of aspects 1 to 5, where the camera duty cycle is adjusted based on a combination of the camera run time and the camera margin time.

Aspect 7 is the apparatus of any of aspects 1 to 6, where the combination of the camera run time and the camera margin time includes inserting the camera margin time prior to the camera run time based on an average exposure time during the camera run time.

Aspect 8 is the apparatus of any of aspects 1 to 7, where the display duty cycle is adjusted based on a combination of the display run time and the display margin time.

Aspect 9 is the apparatus of any of aspects 1 to 8, where the combination of the display run time and the display margin time includes inserting the display margin time prior to the display run time based on an average lighting time during the display run time.

Aspect 10 is the apparatus of any of aspects 1 to 9, where the at least one processor is further configured to: modify at least one of a color value of the display or a brightness value of the display based on at least one of an activation of the display, a deactivation of the display, an activation of the camera, or a deactivation of the camera.

Aspect 11 is the apparatus of any of aspects 1 to 10, where the at least one processor is further configured to: store, in a memory or a buffer, data associated with at least one of the adjusted camera duty cycle, the adjusted display duty cycle, or the adjusted switching frequency.

Aspect 12 is the apparatus of any of aspects 1 to 11, where the camera margin time is based on an activation of the camera or a deactivation of the camera, and where the display margin time is based on an activation of the display or a deactivation of the display.

Aspect 13 is the apparatus of any of aspects 1 to 12, where at least one of the camera duty cycle, the display duty cycle, or the switching frequency is adjusted based on one or more calibration parameters, and where the one or more calibration parameters include at least one of a three-dimensional (3D) lookup table (LUT) parameter, a brightness adjustment ratio parameter, or a gamma table parameter.

Aspect 14 is the apparatus of any of aspects 1 to 13, where the camera duty cycle is a time division duplexing (TDD) camera duty cycle and the display duty cycle is a TDD display duty cycle.

Aspect 15 is the apparatus of any of aspects 1 to 14, where the ALS value is obtained from an ALS sensor in the camera or a camera sensor in the camera.

Aspect 16 is the apparatus of any of aspects 1 to 15, where the camera is an under-display camera in the display or an above-display camera in the display, or where the camera is adjacent to the display.

Aspect 17 is the apparatus of any of aspects 1 to 16, where at least one of the camera duty cycle, the display duty cycle, or the switching frequency is adjusted by a display processing unit (DPU) or a display processor.

Aspect 18 is the apparatus of any of aspects 1 to 17, where the apparatus is a wireless communication device, further including at least one of an antenna or a transceiver coupled to the at least one processor.

Aspect 19 is a method of display processing for implementing any of aspects 1 to 18.

Aspect 20 is an apparatus for display processing including means for implementing any of aspects 1 to 18.

Aspect 21 is a non-transitory computer-readable medium storing computer executable code, the code when executed by at least one processor causes the at least one processor to implement any of aspects 1 to 18.

What is claimed is:

1. An apparatus for display processing, comprising:
   memory; and
   at least one processor coupled to the memory and configured to:
      obtain an ambient light sensor (ALS) value for at least one of a camera run time or a display run time;
      calculate at least one of a camera duty cycle for a camera, a display duty cycle for a display, or a switching frequency based on the ALS value; and
      adjust the display duty cycle based on a combination of the display run time and a display margin time.

2. The apparatus of claim 1, wherein the at least one processor is further configured to:
activate a camera sensor for the camera run time or a display module for the display run time based on at least one of the camera duty cycle, the display duty cycle, the switching frequency, the camera margin time, or the display margin time, wherein at least one of the camera duty cycle, the display duty cycle, or the switching frequency is adjusted based on the activated camera sensor or the activated display module.

3. The apparatus of claim 2, wherein the camera duty cycle corresponds to the camera sensor and the display duty cycle corresponds to the display module, and wherein the camera sensor is associated with a camera timing controller and the display module is associated with a display timing controller.

4. The apparatus of claim 3, wherein the camera timing controller is a time division duplexing (TDD) camera timing controller, and wherein the display timing controller is at least one of a regional TDD display timing controller or a global display timing controller.

5. The apparatus of claim 1, wherein the at least one processor is further configured to:
calculate at least one of the camera margin time for the camera, a camera phase for the camera, the display margin time for the display, or a display phase for the display, wherein at least one of the camera duty cycle, the display duty cycle, or the switching frequency is adjusted based on at least the calculated camera margin time, the calculated camera phase, the calculated display margin time, or the calculated display phase.

6. The apparatus of claim 1, wherein the camera duty cycle is adjusted based on a combination of the camera run time and the camera margin time.

7. The apparatus of claim 6, wherein the combination of the camera run time and the camera margin time includes inserting the camera margin time prior to the camera run time based on an average exposure time during the camera run time.

8. The apparatus of claim 1, wherein the combination of the display run time and the display margin time includes inserting the display margin time prior to the display run time based on an average lighting time during the display run time.

9. The apparatus of claim 1, wherein the at least one processor is further configured to:
modify at least one of a color value of the display or a brightness value of the display based on at least one of an activation of the display, a deactivation of the display, an activation of the camera, or a deactivation of the camera.

10. The apparatus of claim 1, wherein the at least one processor is further configured to:
store, in a first memory or a first buffer, data associated with at least one of the adjusted camera duty cycle, the adjusted display duty cycle, or the adjusted switching frequency.

11. The apparatus of claim 1, wherein the camera margin time is based on an activation of the camera or a deactivation of the camera, and wherein the display margin time is based on an activation of the display or a deactivation of the display.

12. The apparatus of claim 1, wherein at least one of the camera duty cycle, the display duty cycle, or the switching frequency is adjusted based on one or more calibration parameters, and wherein the one or more calibration parameters include at least one of a three-dimensional (3D) lookup table (LUT) parameter, a brightness adjustment ratio parameter, or a gamma table parameter.

13. The apparatus of claim 1, wherein the camera duty cycle is a time division duplexing (TDD) camera duty cycle and the display duty cycle is a TDD display duty cycle.

14. The apparatus of claim 1, wherein the ALS value is obtained from an ALS sensor in the camera or a camera sensor in the camera.

15. The apparatus of claim 1, wherein the camera is an under-display camera in the display or an above-display camera in the display, or wherein the camera is adjacent to the display.

16. The apparatus of claim 1, further comprising at least one of an antenna or a transceiver coupled to the at least one processor, wherein the apparatus is a wireless communication device, and wherein at least one of the camera duty cycle, the display duty cycle, or the switching frequency is adjusted by a display processing unit (DPU) or a display processor.

17. A method of display processing, comprising:
obtaining an ambient light sensor (ALS) value for at least one of a camera run time or a display run time;
calculating at least one of a camera duty cycle for a camera, a display duty cycle for a display, or a switching frequency based on the ALS value; and
adjusting the display duty cycle based on a combination of the display run time and a display margin time.

18. The method of claim 17, further comprising:
activating a camera sensor for the camera run time or a display module for the display run time based on at least one of the camera duty cycle, the display duty cycle, the switching frequency, the camera margin time, or the display margin time, wherein at least one of the camera duty cycle, the display duty cycle, or the switching frequency is adjusted based on the activated camera sensor or the activated display module.

19. The method of claim 18, wherein the camera duty cycle corresponds to the camera sensor and the display duty cycle corresponds to the display module, wherein the camera sensor is associated with a camera timing controller and the display module is associated with a display timing controller, and wherein the camera timing controller is a time division duplexing (TDD) camera timing controller, and wherein the display timing controller is at least one of a regional TDD display timing controller or a global display timing controller.

20. The method of claim 17, further comprising:
calculating at least one of the camera margin time for the camera, a camera phase for the camera, the display margin time for the display, or a display phase for the display, wherein at least one of the camera duty cycle, the display duty cycle, or the switching frequency is adjusted based on at least the calculated camera margin time, the calculated camera phase, the calculated display margin time, or the calculated display phase.

21. The method of claim 17, wherein the camera duty cycle is adjusted based on a combination of the camera run time and the camera margin time, and wherein the combination of the camera run time and the camera margin time includes inserting the camera margin time prior to the camera run time based on an average exposure time during the camera run time.

22. The method of claim 17, wherein the combination of the display run time and the display margin time includes inserting the display margin time prior to the display run time based on an average lighting time during the display run time.

23. The method of claim 17, further comprising:
modifying at least one of a color value of the display or a brightness value of the display based on at least one of an activation of the display, a deactivation of the display, an activation of the camera, or a deactivation of the camera.

24. The method of claim 17, further comprising:
storing, in a memory or a buffer, data associated with at least one of the adjusted camera duty cycle, the adjusted display duty cycle, or the adjusted switching frequency.

25. The method of claim 17, wherein the camera margin time is based on an activation of the camera or a deactivation of the camera, and wherein the display margin time is based on an activation of the display or a deactivation of the display.

26. The method of claim 17, wherein at least one of the camera duty cycle, the display duty cycle, or the switching frequency is adjusted based on one or more calibration parameters, and wherein the one or more calibration parameters include at least one of a three-dimensional (3D) lookup table (LUT) parameter, a brightness adjustment ratio parameter, or a gamma table parameter.

27. The method of claim 17, wherein the camera duty cycle is a time division duplexing (TDD) camera duty cycle and the display duty cycle is a TDD display duty cycle, wherein the ALS value is obtained from an ALS sensor in the camera or a camera sensor in the camera, wherein the camera is an under-display camera in the display or an above-display camera in the display, or wherein the camera is adjacent to the display, and wherein at least one of the camera duty cycle, the display duty cycle, or the switching frequency is adjusted by a display processing unit (DPU) or a display processor.

28. An apparatus for display processing, comprising:
means for obtaining an ambient light sensor (ALS) value for at least one of a camera run time or a display run time;
means for calculating at least one of a camera duty cycle for a camera, a display duty cycle for a display, or a switching frequency based on the ALS value; and
means for adjusting the display duty cycle based on a combination of the display run time and a display margin time.

29. A computer-readable medium storing computer executable code for display processing, the code when executed by a processor causes the processor to:
obtain an ambient light sensor (ALS) value for at least one of a camera run time or a display run time;
calculate at least one of a camera duty cycle for a camera, a display duty cycle for a display, or a switching frequency based on the ALS value; and
adjust the display duty cycle based on a combination of the display run time and a display margin time.

* * * * *